United States Patent [19]
Daponte et al.

[11] Patent Number: 5,942,452
[45] Date of Patent: Aug. 24, 1999

[54] ANTISKID FABRIC

[75] Inventors: Diego H. Daponte, Powder Springs; Paul E. Swindell, Atlanta; Thomas L. Oakley, Marietta, all of Ga.; Kenneth W. Burgess, Seneca, S.C.; Steven M. Pruitt, Rocky Mount, N.C.

[73] Assignee: Amoco Corporation, Chicago, Ill.

[21] Appl. No.: 08/850,170

[22] Filed: May 2, 1997

Related U.S. Application Data

[60] Provisional application No. 60/016,583, May 3, 1996.

[51] Int. Cl.$^6$ ................... B32B 5/26; B32B 27/02
[52] U.S. Cl. ............ 442/382; 442/383; 442/388; 442/389; 442/392; 442/400; 442/401; 442/402; 442/409; 442/414
[58] Field of Search ................ 442/381, 389, 442/383, 382, 388, 400, 401, 402, 409, 392, 414

[56] References Cited

U.S. PATENT DOCUMENTS

| | | | |
|---|---|---|---|
| 4,342,813 | 8/1982 | Erickson | 428/296 |
| 5,173,356 | 12/1992 | Eaton et al. | 428/219 |
| 5,482,772 | 1/1996 | Strack et al. | 428/357 |
| 5,514,751 | 5/1996 | Barsotti | 525/88 |
| 5,529,845 | 6/1996 | Branchesi et al. | 428/359 |

*Primary Examiner*—Marion McCamish
*Assistant Examiner*—Cheryl Juska
*Attorney, Agent, or Firm*—Stephen L. Hensley

[57] ABSTRACT

Composite fabrics particularly suited for upholstery backings and furniture decking comprise at least one layer of a needlepunched web of nonwoven staple fibers adhered to at least one layer of a substantially continuous filament nonwoven web comprising substantially randomly disposed filaments. The filaments comprise a multi-phase, thermoplastic, elastomeric olefin copolymer.

18 Claims, No Drawings

ANTISKID FABRIC

This application claims the benefit of U.S. Provisional Application No. 60/016,583, filed May 3, 1996.

FIELD OF THE INVENTION

This invention relates to continuous filament nonwoven fabrics having antiskid properties and composites comprising the same.

BACKGROUND OF THE INVENTION

There is a need for antiskid fabrics in various applications such as floor mats, furniture decking, filler cloths for bedding and backings for upholstery and rugs. For some applications frictional properties are required at both surfaces of a fabric. Other applications require only one antiskid surface and a second surface with different characteristics.

Prior attempts to obtain such materials have involved application of latex emulsions or even natural waxes such as beeswax to coat fabrics to impart tackiness; however, application of such coatings can complicate manufacture due to the process manipulations, materials and materials handling systems and other equipment required for applying, curing and removing any solvent from the liquid coating materials. Coating both sides of a fabric can also be difficult due to special equipment needs for coating both sides in a single pass or stiffness of fabrics coated on one side if a two step coating process is used. Further, latex formulations are typically based on rubbery polymers that are not, or are only poorly, compatible with the plastic materials often used to make the fabrics to which the coatings are applied. This prevents reuse of trim, scrap and the like in plastics recycling operations involving melt processing, not only representing inefficient use of raw materials but also requiring alternative disposal techniques.

Another known approach to imparting antiskid or friction properties to fabrics is to laminate fabrics to a film of a tacky plastic or elastomeric resin such as ethylene vinyl acetate copolymer, ethylene-propylene copolymer or ethylene-propylene-diene terpolymers. This approach obviates the need for liquid latex handling equipment but, depending on the choice of film and composition of the substrate, may not improve recyclability. Moreover, achieving adequate bonding of films to fabrics is often difficult due to a variety of factors including poor adhesion between their materials of construction and configuration of the substrate. The laminated fabrics also tend to be stiff such that further processing and use are impaired. In addition, if the film used to impart tackiness is too tacky under temperature and humidity conditions normally encountered in storage, handling, further processing or use, both the films and the laminated substrates may be impaired or require special processing or expensive release papers to ensure utility.

Elastomeric, substantially continuous filament nonwoven webs of copolyester ether elastomers according to commonly assigned U.S. Pat. No. 5,173,356 also are known. The webs exhibit considerable tackiness and show poor adhesion to many common plastics used in fabrics and poor compatibility with such plastics for purposes of recycling operations. They also are too costly for widespread use in many applications for antiskid fabrics. The aforementioned patent also discloses continuous filament nonwoven webs having filaments comprising thermoplastic elastomers including polyurethanes and elastomeric olefin polymers. Composites thereof with other materials including various woven and nonwoven fabric substrates are also disclosed.

SUMMARY OF THE INVENTION

This invention provides improved antiskid fabrics comprising a nonwoven web of substantially continuous filaments comprising a multi-phase, elastomeric olefin polymer. In another embodiment, the invention provides composite structures in which at least one layer of nonwoven web of substantially continuous filaments comprising a multi-phase, elastomeric olefin polymer is adhered to a substrate. In a particularly preferred embodiment of the invention there are provided composite fabrics comprising at least one layer of such nonwoven web laminated to at least one layer of a needlepunched, nonwoven web comprising staple fibers of at least one thermoplastic resin.

The invented webs exhibit improved frictional resistance, particularly in contact with other types of fabrics. However this improved friction is achieved without the tackiness that characterizes known friction fabrics. Accordingly, the webs provide a combination of friction properties, aesthetics and ease of use and handling that is superior to many known friction fabrics.

Advantageously, the nonwoven, multi-phase, elastomeric olefin polymer webs also exhibit a combination of strength, coverage and frictional properties making them well suited for various antiskid applications. Moreover, the fabrics can be adhered or laminated to other fabrics and substrates such that composite structures having a wide range of properties for various end uses are easily attained. Composite structures having widely different characteristics or properties contributed by their opposing surfaces are readily attained by combining the invented antiskid nonwoven webs with other substrates to form composites.

Another advantage of the invented nonwoven fabrics when used in composite structures with polyolefin fabrics is their compatibility for purposes of recycle. This allows reuse of trim, waste and scrap from the manufacturing process in a wide range of plastic melt processing operations such as extrusion, molding and spinning, thereby eliminating the need for alternative, typically more costly, disposal of such waste and reducing overall cost of the composite products.

Still another advantage of the invented webs and composites is that they can be prepared with suitable strength, flexibility and tackiness to be handled as roll goods. This is in contrast to many rubbery films and coated fabrics which are too stiff and/or too tacky to be handled efficiently in roll form.

DESCRIPTION OF THE INVENTION

In greater detail the nonwoven webs of this invention comprise a plurality of substantially continuous filaments disposed essentially randomly throughout the web. The webs exhibit sufficient strength and integrity as a result of filament to filament bonding, whether through entanglement, adhesive or cohesive bonding or a combination thereof, as to allow handling thereof as roligoods, e.g., by winding onto takeup rolls, transporting and storing in roll form and/or feeding to further processing operations or equipment from feed rolls. Depending on the manner in which the webs are formed, strength along the length of the web may typically differ from that along its width. Lengthwise strength, also referred to as machine direction strength, preferably is at least about 1 pound and more preferably about 1.5 to about 3 pounds. Widthwise strength, also referred to as cross direction strength, preferably is at least about 1.5 pound and, more preferably about 2 to about 4 pounds. Desirably, the webs exhibit such strengths as a result of autogenous bonding of their filaments because bonding by other means tends to decrease flexibility and impair further processing of the webs. However, if desired or necessary, it is contemplated that the filaments of the web can be bonded through the use of adhesives or other bonding techniques such as thermobonding, ultrasonic bonding, stitching and other suitable techniques.

The webs exhibit friction properties without excessive tackiness. For purposes of this invention, this characteristic is measured by friction testing according to the procedure of ASTM D3334-80. Briefly, the test measures friction between two surfaces and involves securing a test sample to a horizontally disposed test surface, placing on the sample a prescribed weight rapped with a reference material and gradually elevating the surface at one of its ends until the wrapped weight begins to slide. The angle of inclination of the surface from the horizontal is measured in degrees. For purposes hereof, the reference material is a needlepunched, calendered, nonwoven fabric designated Duon® 0328 available from Amoco Fabrics and Fibers Company. It is composed of homopolymer polypropylene staple fiber of 5 denier and 4 inch length. The measurement is referred to herein as the relative friction value or relative friction number.

The invented webs have relative friction numbers of at least about 28° and, preferably, at least about 30°. Webs with relative friction numbers of about 30 to about 50° are particularly preferred from the standpoint of providing good friction properties without being so tacky as to complicate manufacture, handling and further processing of the webs. It will be appreciated that optimum friction properties for various end uses will vary depending on the nature of the end use, as is well known to those skilled in the end use arts. An advantage of the invented webs is that they can be formulated from polymeric compositions containing the elastomeric multi-phase polymers utilized herein in combination with other thermoplastic resins in various proportions to achieve friction properties tailored to end use requirements. Particularly suitable thermoplastic resins for blending with the multi-phase copolymers, both from the standpoint of ease of processing and product properties, are polypropylene homopolymers and propylene-dominated ethylene-propylene copolymers.

The webs can be provided in any desired basis weight. Specific weights for various applications will vary with end use requirements and can be determined by those skilled in the art. Preferred webs for imparting antiskid properties to a wide range of fabrics useful in manufacture of furniture are those with weights of about ¼ to about 1 ounce per square yard ("osy").

The filaments of the web are so-called continuous filaments in the sense that they tend to be of substantially indefinite and/or indeterminate lengths. The filaments are referred to herein as "substantially continuous" filaments and, as will be evident to those skilled in the art, are to be distinguished from staple fibers which typically have relatively short lengths. Typically, filaments of the web have diameters in the range of about 5 to about 50 microns and, preferably, about 10 to about 30 microns because the same tend to provide nonwoven webs having a beneficial combination of strength, coverage, flexibility and hand.

The web comprises filaments of a multi-phase, elastomeric olefin polymer composition. Polymers of this type are known and are copolymeric compositions that generally comprise at least one substantially non-elastomeric, crystalline thermoplastic domain comprising polymerized olefin units and at least one elastomeric domain comprising polymerized olefin units. As used herein, the term copolymer means polymeric compositions having two or more different types of repeat units in their chains. The polymeric compositions are multi-phase compositions in the sense that they comprise substantially large domains or segments of each of the elastomeric and non-elastomeric components as to exhibit both thermoplastic and elastomeric properties. In this respect, the polymers are considerably different from random copolymeric compositions, for example so-called random ethylene-propylene copolymers, in which the polymer chains consist mainly of one type of repeat unit but also have one or more other types of repeat units randomly distributed along the chains. In general, the elastomeric domains of the multi-phase copolymers of which the invented webs are composed constitute about 5 to about 95 wt. % of the copolymers, with about 20 to about 80 wt. % being preferred to achieve antiskid properties suited for a wide range of applications without so much tackiness as to interfere with formation and use of the invented webs by economical and efficient processing techniques.

The substantially non-elastomeric domains of the multi-phase copolymer compositions preferably comprise at least one thermoplastic homo- or copolymer segment in which the repeat units predominantly comprise one or more polymerized alpha-olefin of two to about eight carbon atoms. Examples of such olefins include ethylene, propylene, 1-butene, 1 -pentene, 1-hexene and 4-methyl pentene-1. Combinations thereof also can be present; particularly preferred combinations include ethylene-dominated combinations of ethylene with one or more of butene-1, hexene-1 and octene-1 and propylene-dominated combinations of propylene and ethylene. Preferred units making up the substantially non-elastomeric domains of the multi-phase copolymer are homopolymer polypropylene units and random propylene-ethylene copolymer units in which the content of polymerized propylene units is at least about 85 wt. %. Compositions containing domains comprising combinations of such units also are contemplated and can provide beneficial results in various respects such as softness of the nonwoven web and improved thermobondability to other plastic substrates, and particularly other fabrics, due to broadening of the crystalline melting point as compared to compositions in which the substantially non-elastomeric domain is a homopolymer composition.

The elastomeric segment or domain of the multi-phase copolymer composition preferably comprises a rubbery copolymeric composition in which the repeat units of the copolymer chains include polymerized alpha-olefin of 2 to about 8 carbon atoms or diolefin of 4 to about 20 carbon atoms. Examples of the latter include butadiene, isoprene, 1,3- and 1,4-hexadiene, cyclopentadiene and 2-ethylidene-5-norbornene. The elastomeric segment also can contain combinations of alpha-olefin- and diene-based units. Preferred elastomeric segments comprise a copolymer of ethylene with a higher alpha-olefin of three to about eight carbon atoms, especially propylene, and optionally with one or more diene, and in which the content of polymerized ethylene units ranges from about 15 to about 70 wt. %.

Preferred elastomeric olefin polymers are those comprising polymerized propylene units in both the elastomeric and substantially non-elastomeric segments. Such polymers exhibit not only a good balance of friction properties and processibility for the invented webs but also good adhesion to substrates and, in particular, good thermobondability and adhesion to other synthetic fabrics. Particularly preferred elastomeric polymers comprise substantially non-elastomeric domains of propylene homopolymer or copolymer with up to about 15 wt. % ethylene and elastomeric domains of a rubbery ethylene-propylene or ethylene-propylene-diene copolymer.

An example of a preferred multi-phase copolymer for the nonwoven webs of this invention is a so-called heterophasic polymer composition as described in U.S. Pat. No. 5,368,927, issued Nov. 29, 1994, which is incorporated herein by reference. The polymeric compositions of this patent are said to have good film-forming and thermobonding properties. The polymeric compositions comprise (a) about 10 to about 60 wt. %, preferably about 20 to about 50 wt. %, of polypropylene homopolymer with an isotactic index (percentage by weight of fraction insoluble in boiling n-heptane) higher than 80, preferably between 90 and 98, or crystalline copolymer of propylene with ethylene and/or an alpha-olefin having 4 to 20 carbon atoms, containing 85 wt. % or more of propylene and having an isotactic index of at least about 80; (b) about 3 to about 25 wt. % of ethylene-propylene copolymer, preferably containing from about 0.5 to about 5 wt. % of propylene and insoluble in xylene at ambient temperature; and (c) about 15 to about 87 wt. %, preferably about 30 to about 75 wt. %, of a copolymer of ethylene with propylene and/or an alpha-olefin having 4 to 10 carbon atoms, and optionally a diene, containing about 20 to about 60 wt. % of ethylene and completely soluble in xylene at ambient temperature. Examples of preferred alpha-olefins having 4 to 10 carbon atoms that can be present in (a) and in (c) are 1-butene, 4-methyl-1-pentene and 1-hexene.

Such heterophasic polymer compositions can be prepared by way of sequential polymerization in two or more stages, using highly stereospecific Ziegler-Natta catalysts. Component (a) is formed in the first stages of polymerization while (b) and (c) are formed in one or more subsequent polymerization stages.

As noted above, the invented webs can be composed entirely of the multi-phase, elastomeric polymer or of combinations thereof with other thermoplastic resin compositions. Propylene polymer resins are preferred for such combinations although other resins such as high, low and linear low density polyethylenes, polyesters such as polyethylene terephthalate and polyamides such as nylon 6 and nylon 66 also are contemplated. The multi-phase elastomeric polymers of the invented webs are normally incompatible with polyesters and polyamides in the melt, such that articles melt processed from combinations of such resins tend to exhibit an essentially continuous phase of the predominant resin in the combination having dispersed therein domains or particles of the lesser resin component. For some applications, this can provide a beneficial or interesting combination of friction and other properties. Preferably, blends of the multi-phase elastomeric polymer with one or more other resins contain at least about 25 wt. % of the multi-phase resin.

The resin compositions of which the antiskid webs of the invention are composed also can contain or incorporate various additives and modifiers. Examples include pigments and colorants, antistatic agents, antimicrobial agents, heat, light and oxidation stabilizers, flame retardants, fillers and extenders. These materials and their use are well known to persons skilled in the art.

The nonwoven, antiskid webs of the invention can be prepared by any suitable method for preparing substantially continuous filament nonwovens. Generally, such methods involve spinning molten resin composition comprising the multi-phase thermoplastic elastomeric polymer through a plurality of spinning orifices to form a plurality of substantially continuous filaments and collecting the filaments in the form of a web. As noted above, additional bonding agents or techniques can be utilized if desired or necessary although preferred webs for many uses are those with sufficient strength simply as a result of filament formation and collection to enable further handling and use without the need for auxiliary bonding.

One process by which the webs may be formed is the so-called spunbonded process in which filaments are extruded from molten resin onto a moving surface in the form of a relatively loose assembly of randomly disposed filaments and then subjected to additional bonding, typically by thermobonding using heated calendar rolls or pointbonding using a heated roll having a series of points or other projections. Spunbonded processes are well known to persons skilled in the continuous filament nonwovens art; an example is disclosed in U.S. Pat. No. 4,340,563. Spunbonded processes are best suited for manufacture of the invented webs wherein the multi-phase elastomeric polymer composition is blended with one or more less elastomeric resin compositions, such as propylene homopolymer or propylene-dominated ethylene-propylene copolymer. The tackiness of the multi-phase polymer is such that undesirable sticking, agglomeration and balling of filaments may occur during extrusion and collection thereof unless the polymer is blended with a less tacky resin or other precautions are taken to prevent such sticking and balling.

Another suitable process for making the invented webs is the so-called melt blown process in which molten filaments are extruded into a high speed stream of air that attenuates and quenches the filaments, after which the filaments are collected such as on a moving screen, belt or other conveyer. The high speed air or other gas used in melt-blowing processes serve to stretch the extruded filaments with the result that the same are typically finer than the filaments of spunbonded webs. As with spunbonded processes, melt-blowing processes are well known. U.S. Pat. No. 3,849,241 discloses an example.

Centrifugal spinning processes also are suitable for making the invented webs. Such processes usually involve spinning molten filaments from a rotating spinning head, or from a stationary die into a rotating collection device, and removing the filaments in the form of a tube. The tube can be utilized in that form or it can be slit and opened to obtain a web of greater width or a plurality of narrower webs. Centrifugal spinning processes in which the molten filaments are spun from a rotating die head into a stream of air or other gas flowing radially outwardly from the vicinity of the center of the diehead are particularly efficacious for manufacture of the invented webs because the air stream serves to quench the filaments such that tackiness of the multi-phase polymer does not pose difficulties in terms of sticking or agglomeration of filaments. High air speeds also tend to promote a high degree of uniformity of coverage of the webs.

Preferred processes and equipment for manufacture of the invented webs are disclosed in U.S. Pat. No. 4,790,356, and in commonly assigned U.S. Pat. No. 5,173,356, both of which are incorporated herein by reference. The processes disclosed therein involve extruding a molten polymer through multiple orifices located in a rotating die, and collecting the filaments on a collection device whereby the filaments extruded through the die strike the collection device and self-bond to each other to form the nonwoven web. The process of the latter patent further comprises contacting the extruded polymer while hot as it exits the orifices with a fluid stream having a velocity of 14,000 ft/min or greater.

In a preferred process for making the webs, a source of fiber forming material in the form of a melt is provided and pumped into a rotating die having a plurality of spinnerets about its periphery. The rotating die is rotated at an adjustable speed such that the periphery of the die has a spinning speed of about 150 to about 2000 m/min, calculated by multiplying the periphery circumference by the rotating die rotation speed measured in revolutions per minute.

Polymer melt comprising multi-phase elastomeric copolymer is extruded through a plurality of spinnerets located about the circumference of the rotating die. There can be multiple spinning orifices per spinneret with the diameter of individual spinning orifices being between about 0.1 to about 2.5 mm, preferably about 0.2 to about 1.0 mm. The capillary length-to-diameter ratio of the spinneret is about 1:1 to about 10:1. The particular geometrical configuration of the spinneret orifice can be circular, elliptical, trilobal or any other suitable configuration. Preferably, the configuration of the spinneret orifice is circular or trilobal.

The rate of polymer extruded through the spinneret orifices preferably is about 0.05 to about 5.0 lb/hr/orifice.

As the fibers are extruded horizontally through spinneret orifices in the circumference of the rotating die, the fibers assume a helical orbit as they begin to fall below the rotating die. The fluid stream which contacts the fibers can be directed downward onto the fibers, can surround the fibers or can be directed essentially parallel to the extruded fibers. In one embodiment, a fluid delivery system having a radial aspirator surrounding the rotary die is utilized. The aspirator has an outlet channel with an exit and a blower for providing fluid to the aspirator so that the velocity of the fluid at the exit of the outlet channel of the aspirator is about 14,000 ft/min or greater. Preferably, the fluid is ambient air. The air can also be conditioned by heating, cooling, humidifying, or dehumidifying. The preferred velocity of the air at the exit of the outlet channel of the aspirator is about 20,000 to about 25,000 ft/min. An example of a suitable blower is a pressure air blower fan capable of generating over 50 inches of water gauge at volumetric flow rates of 3000 cubic feet per minute or more.

Polymer fibers extruded through the spinneret orifices of the rotary die are contacted by the quench air stream of the aspirator. The quench air stream can be directed around, above or essentially parallel to the extruded fibers. It is also contemplated to extrude the filaments into the air stream.

In one embodiment, the quench air stream is directed radially above the fibers which are drawn toward the high velocity air stream as a result of a partial vacuum created in the area of the fiber by the air stream as it exits the aspirator. The polymer fibers then enter the high velocity air stream and are drawn, quenched and transported to a collection surface. The high velocity air, accelerated and distributed in a radial manner, contributes to the attenuation or drawing of the radially extruded thermoplastic elastomeric fibers. The accelerated air velocities contribute to the placement or "laydown" of fibers onto a circular fiber collector surface or collector plate such that nonwoven webs are formed that exhibit a beneficial combination of properties including high tensile strength, low elongation, and essentially balanced physical properties in the machine and cross directions.

The fibers are conveyed to the collector plate at elevated air speeds of 14,000 ft/min or greater to promote entanglement of the fibers for web integrity and produce an elastomeric, antiskid fibrous nonwoven web, preferably with essentially balanced strength properties in the machine direction and cross-machine direction.

While the fibers are moving at a speed dependent upon the speed of rotation of the die as they are drawn down, by the time the fibers reach the outer diameter of the orbit, they are not moving circumferentially but are merely being laid down in that particular orbit basically one on top of another. The particular orbit may change depending on variation of rotational speed, extrudate input, temperature, etc. External forces such as electrostatic charge or air pressure may be used to alter the orbit and, therefore, deflect the fibers into different patterns.

The fibrous nonwoven webs are produced by allowing the extruded thermoplastic fibers to contact each other as the fibers are deposited on a collection surface. Many of the fibers, but not all, adhere to each other at their contact points thereby forming a self-bonded, fibrous nonwoven web. Adhesion of the fibers may be due to fusion of the hot fibers as they contact each other, to entanglement of the fibers with each other or to a combination of fusion and entanglement. Generally, the adhesion of the fibers is such that the nonwoven web after being laid down but before further treatment has sufficient machine and cross direction strengths to allow handling of the web without additional treatment.

The nonwoven fabric will conform to the shape of the collection surface. The collection surface can be of various shapes such as a cone-shaped inverted bucket, a moving screen or a flat surface in the shape of an annular strike plate located slightly below the elevation of the die and with the inner diameter of the annular strike plate being at an adjustable, lower elevation than the outer diameter of the strike plate. Application of an antisticking agent, such as a silicon, or lubricant to the surfaces of the collection device contacted by the hot filaments can be beneficial in promoting smooth operation.

When an annular strike plate is used as the collection surface, many of the fibers are bonded together during contact with each other and with the annular strike plate, thereby producing a nonwoven fabric which is drawn back through the aperture of the annular strike plate as a tubular fabric. A stationary spreader can be supported below the rotary die to spread the fabric into a flat two-ply composite which is collected by a pull roll and winder. In the alternative, a knife arrangement can be used to cut the tubular two-ply fabric into a single-ply fabric which can be collected by the pull roll and winder.

Temperature of the thermoplastic melt affects the process stability for the particular thermoplastic used. The temperature must be sufficiently high so as to enable drawdown, but not too high so as to allow excessive thermal degradation of the thermoplastic.

Process parameters which influence filament formation include spinneret orifice design, dimensions and number, extrusion rate of polymer through the orifices, quench air velocity and the rotary die rotational speed.

Fiber denier can be influenced by all of the above parameters with fiber denier typically increasing with larger spinneret orifices, higher extrusion rates per orifice, lower air quench velocity and lower rotary die rotation with other parameters remaining constant.

Productivity is influenced by the dimension and number of spinneret orifices, the extrusion rate and, for a given denier fiber, die rotation.

The system provides process parameters whereby various fiber deniers can be attained simply by varying die rotation and/or pumping rate and/or air quench velocity. At a given die rotation, pumping rate and air quench velocity, the denier for individual filaments within a web can range from about 0.5 to about 20 denier for 90% or greater of the fibers. Typically, the average value for filament denier is in the range of about 1 to about 7. For relatively high air quench velocities the average filament deniers are in range of about 1 to about 5 denier.

The nonwoven webs exhibit balanced physical properties such that the ratio of the machine direction tensile strength to the cross direction tensile strength is close to 1. However, the ratio can be varied by varying the quench air velocity to produce webs with greater strength in one or the other direction. Preferably, the ratio of machine direction to cross direction tensile strength is about 1:1 to about 1.5:1.

The nonwoven webs of the present invention can be used as is in various applications, for example as an underlayment for rugs, or as one or more layers bonded to each other or bonded to a substrate. Examples of substrates include other fabrics, films, foils, papers, sheets and so forth. The bonding can be accomplished by thermal bonding, point embossing, needle punching or any other suitable bonding technique used in woven and nonwoven fabric technologies. The additional layers can be one or more like or different materials such as a woven fabric, a spunbonded nonwoven fabric, a meltblown nonwoven fabric, a carded web, a porous film, an impervious film, metallic foils and the like. The bonding parameters, e.g., temperature, pressure, dwell time in the nip, number of bonds or perforations per square inch and percent area coverage are determined by the substrate material used and by the characteristics preferred in the finished product. Composite products combine the nonwoven web of the present invention, which has good friction and thermobonding properties and balanced physical properties such as tensile strength, with one or more distinct materials.

Preferred composite fabrics comprise the nonwoven antiskid web adhered to at least one nonwoven fabric comprising thermoplastic staple fibers. Such staple fiber fabrics are well known and generally comprise a plurality of staple fibers of natural or synthetic material associated into a coherent web or mat. The resulting composites, and particularly those in which the staple fiber fabric is a needlepunched nonwoven, are particularly useful as furniture and upholstery fabrics.

In greater detail, such nonwoven staple fiber fabrics comprise staple fibers such as cotton or thermoplastic staple fiber such as rayon, a polyester, a polyolefin, such as polypropylene, blends of polyolefins such as polypropylene and polybutene and polypropylene and linear low density polyethylene, having a length between about 1.9 and 20 cm. Propylene staple fibers are preferred in this invention. The denier of these fibers is in the range of about 1 to about 8 and the crimps per inch for polyolefins and polyesters is about 4 to about 30, and for staple fiber of rayon the crimps per inch is about 8 to about 14. The staple fibers are supplied to a carding line in the form of bales or bundles which are opened mechanically by pickers equipped with sharp teeth or needles to tear the tightly compacted fibers apart by a process called picking. The fibers are transferred mechanically on belts or by chutes to form fiber batts, called picker laps, which are processed by carding.

The carding process can be a revolving flat, stationary flat or workerstripper process. For example, in the revolving flat carding process, a carding machine utilizes opposed moving beds of closely spaced needles to pull and tease the fibers apart. At the center of the carding machine is a large, rotating cylinder covered with a card clothing comprised of needles, wires, or fine metallic teeth embedded in a heavy cloth or metal foundation. Opposing moving beds of needles are wrapped on the large cylinder and a large number of narrow flats are held on an endless belt moving over the top of the cylinder. The needles of the two opposing surfaces are inclined in opposite directions and move at different speeds with the main cylinder moving faster than the flats.

The clumps of fibers between the two beds of needles are separated into individual fibers which are aligned in the machine direction as each fiber is theoretically held by individual needles from the two beds. The fibers engage each other randomly and form a coherent web at and below the surfaces of the needles. The carding machine may also include means to carry the picker lap or batt onto the cylinder where the carding takes place. Other mechanical means remove or doff the web from the cylinder. The doffed web is deposited onto a moving belt where it can be combined with other webs. Carded webs can be up to 3.5 m wide or wider and can be produced at speeds up to 140 m/min or faster. Nonwoven webs made from webs from conventional cards have high machine direction and low cross-machine direction tensile strengths. The problem of low cross-machine tensile strength can be solved by cross-laying an oriented web at or near a 45° angle to another oriented web on the moving belt. However, this procedure is generally not successful with low basis weight carded webs because of the difficulty of accurately laying down the layers without unsightly edge lines.

Although not necessary to the practice of this invention, non-woven fabrics prepared from staple fibers are preferably needlepunched, for example, as described in U.S. Pat. No. 4,154,889. The preparation of a preferred unfused, crosslapped, non-woven fabric which can be employed in the practice of the present invention is described in U.S. Pat. No. 4,342,813, which disclosure is incorporated by reference herein.

Needlepunched fabric used according to this embodiment of the present invention can have a weight selected over a relatively broad range. Generally, fabrics having a weight of about 1 to about 20 osy are employed. Preferably fabrics having a weight of 1 to about 15 and most preferably 2 to about 14 osy are employed. The widths of the fabrics can vary widely. Widths achievable are limited only by the size equipment one has available for fabric treatment.

The needlepunched fabric can also be fused on one or on both sides. Such prior fusion of the fabric can be accomplished by any means, such as infrared fusion or hot roll fusion. Fusion of such fabrics preferably is accomplished prior to and/or during bonding of the same to the antiskid webs of the invention. Most preferably, fusion is accomplished by application of a wetting agent to one or both fabrics and vaporizing the same. A preferred process for application of wetting agents is described in detail in commonly assigned U.S. Pat. No. 4,576,852.

The wetting agent can be any liquid which will be absorbed into at least some of the void spaces of the fabric and/or the web without significant dissolution thereof, and which vaporizes at or below the softening point thereof. In addition, the wetting agent may also contain additional modifying agents such as dyes, pigments, binders, bleaching agents, thickening agents, softening agents, detergents, surface active agents and the like and mixtures of any two or more thereof.

Suitable wetting agents include water, and water containing minor amounts of alcohols, aromatics such as toluene and xylene, chlorinated hydrocarbons such as carbon tetrachloride and the like. Water is preferred since it is inexpensive, readily available and creates minimum handling problems upon vaporization.

The wetting agent can be applied to the web or fabric in any suitable manner. For example, a web or fabric can be sprayed on one or both sides with wetting agent prior to contract with heated fusion rolls. Alternatively, the feed web or fabric can be fed through wetting agent contained in a vessel and then brought into contact with the heated fusion roll. As another variation, feed fabric and/or web wetted by passage through wetting agent contained in a vessel can be further contacted to remove some of the wetting agent prior to contact with the heated fusion roll. Thus, for example, squeeze rolls or heated rolls may be employed, positioned ahead of the heated fusion roll and associated back-up roll, to control the amount of wetting agent retained by the fabric or web prior to contact with the heated fusion roll.

Any amount of wetting agent added to the feed fabric or web will result in a fabric or composite fused with increased strength and/or improved pattern definition and/or improved soft hand. Typically about 1 to 200 weight percent of wetting agent, based on the dry weight of the web and/or feed fabric, will be employed. Preferably the wetted web and/or fabric prior to contact with a heated fusion roll will contain about 20 to 100 wt. % wetting agent, based on the weight of dry feed. Most preferably, the wetted web and/or fabric will contain about 30 to about 90 wt. % wetting agent based on the weight of the dry feed.

For best results, i.e., optimum increase in strength and pattern definition upon fusion treatment, it is desirable that the fabric or web be essentially uniformly treated with the wetting agent. The resulting product has improved strength and reduced thickness for a given weight.

If desired, the needlepunched fabric can be subjected to a variety of modifying agents at any suitable point during the fabric processing. Thus, components such as dyes, pigments, binders, bleaching agents, thickening agents, softening agents, detergents, surface active agents and the like and mixtures of any two or more thereof may suitably be applied to the fabric before or after application of wetting agent, as well as during the application of wetting agent, as discussed above. In some cases, modifying agents can suitably be applied after the fabric is subjected to fusion conditions.

The temperature of the heated fusion roll must be high enough to raise the temperature of the wetting agent to a temperature sufficient to cause fusion of at least a portion of the fibers in the fabric or the antiskid web. That temperature is dependent on a number of parameters, such as, for example, compositions of the fabric and/or web, line speeds, the fabric and web weights, nip pressure applied by the fusion roll, the type and amount of wetting agent employed, and the like. As a minimum, the temperature employed should be at least about the softening point or stick point of the lowest melting component of the fabric and/or web being treated under the particular conditions employed. For example, where polypropylene fabric is treated, a suitable temperature range is about 163°–191° C. (325°–375° F.). Higher temperatures within the suitable temperature range can be employed where high feed rates are utilized, thereby reducing the time of contact with the heated fusion roll. Lower temperatures within the suitable temperature range can be employed, for example, where the fabric or web has been treated with low melting binders. Thus, temperature up to the point where essentially complete melting of all the fibers are suitable.

The heated fusion rolls can be heated, for example, by interior circulating hot oil, resistance heaters, high pressure steam or other suitable heating fluid passed through the core thereof.

As noted above, the temperature of the heated fusion roll can be varied somewhat depending on the pressure applied at the nip and the rate at which fabric and/or web is brought into contact with the heated fusion roll. Typically lower temperatures are required where higher nip pressures are employed. Although the application of most any pressure will aid the fusion process, nip pressures of about 20 to about 10,000 pounds per lineal inch (pli) are typical. Preferred pressures are about 50 to 5000 pli, with pressures of about 100 to about 3000 pli most preferred.

For purposes of this invention, it is intended that the conditions of temperature and nip pressure as detailed above be applied across substantially the entire width of the fabric and/or web.

The rate at which fabric and/or web is brought into contact with the heated fusion roll is limited only by the equipment employed. Where high feed rates, i.e., greater than about 50 feet per minute, are possible, higher temperatures and/or nip pressures will be appropriate. Where equipment limitations require slow feed rates, reduced fusion temperatures and/or nip pressures are advisable to prevent filament degradation.

The wetted fabric and/or web can be subjected to fusion conditions in a variety of ways. Thus, the wetted thermoplastic fabric and/or web may be passed between a smooth heated roll and smooth rubber backup roll. Alternatively, the backup roll can be a smooth metal roll. As yet another alternative, the wetted fabric and/or web may be passed in contact with a heated embossing roll backed by a smooth rubber roll or a smooth metal roll. As noted above, the web and/or fabric treated according to the present invention can be previously fused prior to treating with wetting agent and contacting with a heated fusion roll. Thus, where feed has been previously fused on one side, such as, for example, as described in U.S. Pat No. 4,105,484 and U.S. Pat. No. 4,151,023, it can be brought into contact with a heated fusion roll in such an orientation that the face side (fused side) or back side (unfused side) is brought into contact with the fusion roll after treating with wetting agent. As also noted above, feed fabric and/or web at least partially fused on both sides can be further fused by the process of the present invention. Thus, such feed fabric and/or web can be subjected to fusion by a smooth heated roll or a heated embossing roll, in either case employing such as a smooth rubber, smooth metal or cloth wrapped backup roll. Other means of fusion employing, for example, a heated embossing roll and a smooth heated roll or two smooth heated rolls or two heated embossing rolls are contemplated.

The multi-layer nonwoven web composites of the present invention can also be produced by other means for adhering at least one layer of the antiskid nonwoven web having a plurality of substantially randomly disposed, substantially continuous filaments to at least one layer of carded web, needlepunched nonwoven, with or without fusion, or other fabric substrates. Other processes for adhering the layers of the multi-layer composites of the present invention can be any of the bonding techniques of thermal, chemical/adhesion, ultrasonic, hydroentangling and needling. Needling is typically used for bonding of composites having basis weights of 100 g/m$^2$ or greater. Thermal and chemical/adhesive bonding can be either point-or area-bonding with the choice of bonding dependent upon the ultimate application for the composite.

By "hydroentangling" is meant that a plurality of high pressure columnar streams of liquid are jetted toward a surface of the components of the composites of the present invention thereby entangling and intertwining filaments of one or more layers of the antiskid nonwoven web with one or more layers of the other fabric to provide the composite.

Composites of uniform basis weight self-bonded nonwoven webs and carded webs subjected to the hydroentangling can be completely nonwoven such that these composites do not contain a woven or knitted constituent. Other nonwoven layers such as nets, scrims, foams or polymeric coatings can also be laminated to hydroentangled multilayer nonwoven web composites of the present invention. These composites can also undergo additional bonding by chemical or thermal means if properties such as added strength are desired.

Hydroentangling, also referred to as hydraulic entangling, involves treatment of the layers of the composite with the composite on a support which contains apertures through which streams of liquid, such as water, issue from jet devices. The support can be a mesh screen, forming wires or a support with a pattern such that a nonwoven material can be formed having that pattern. Fiber entanglement is accomplished by jetting liquid supplied at pressures from about 700 to about 20,000 kPa to form fine, essentially columnar, liquid streams until the fibers are randomly entangled and interconnected. The composite can be passed through the hydraulic entangling apparatus one or more times on one or both sides. The jet orifices which produce the columnar liquid streams can have typical diameters known in the art, for example, 1.25 mm, and can be arranged in one or more rows with multiple orifices. Various techniques of hydraulic entanglement are disclosed in U.S. Pat. No. 4,950,351 and the references described therein.

After the composite has been hydroentangled, it can be dried by a thru-air drier or other means and then wound unto a take-up roll. Optionally, after hydroentanglement, the composite can be further treated, such as by thermal bonding, coating, and the like.

In the process of thermal point-bonding, a heated calender is used comprising heated rolls between which are passed the individual layers of the composite to be bonded. The calender rolls can be made from steel, steel wool and the like and can have working widths up to 3 m or greater and diameters related to the working width of the calender for required stiffness and strength of the rolls. The calender rolls can be oriented such that the composites can be formed by passing between the calender rolls in either an horizontal or a vertical direction. One or both rolls can contain embossing patterns for point-bonding and can be heated by electrical heating or oil heating.

The bonding pattern of the embossing rolls can have a regular or intermittent pattern. Typically, an intermittent pattern is used with the area of composite surface occupied by bonds ranging from about 5 to 50 percent of the surface area, preferably about 10 to about 25 percent of the surface area. The bonding can be done as point-bonding or stripe-bonding with the intent of the bonding being to keep the layers of the composite from delaminating while at the same time not forming an overly stiff composite.

Depending on factors such as the resins or other materials used for the various composite layers, the desired composite production rate, the composite basis weight, and the embossing pattern design, calender process parameters such as the temperature of the embossing rolls, the pressure exerted on the composite by the rolls and the speed of the webs or fabrics fed to the calender can be varied to achieve the desired results. The temperature of the calender rolls can range from about 105° to about 235° C., the pressure exerted on the composite by the rollers can range from about 10 to about 1000 pli and the speed of the fabric and/or nonwoven webs fed to the calender can range from about 0.05 to about 7.5 m/s.

If the calender roll temperatures are too low for the particular multilayer composite being formed, the layers of the resulting composite will tend to delaminate because insufficient bonding of the layers has occurred; however, if the calender roll temperatures are too high, the layers can fuse and may yield composites with less desirable properties.

The following examples illustrate the invention but are not intended to limit its scope.

EXAMPLE 1

An antiskid nonwoven web of substantially continuous filaments was prepared using a centrifugal spinning system as described in the examples of U.S. Pat. No. 5,173,356 operated in a manner substantially as described therein and under conditions as described below. The web was prepared from an olefinic polymer resin obtained from Himont Corporation designated KS-057P. The resin had a nominal melt flow rate of 30 g/10 minutes according to ASTM D-1238 and exhibited a crystalline melting point peak at about 142° C. determined by differential scanning calorimetry (DSC). Extraction of the resin with n-hexane at 160° C. yielded an average of about 45 to about 52 wt. % extractables. This relatively high level of hexane extractables together with the relatively well defined crystalline melting point peak are indicative of the multi-phase nature of the resin.

In the centrifugal spinning operation, the extruder was operated at barrel temperature settings of 450° F., 485° F., 580° F., 580° F., 590° F. and 590° F. The adapter and screen changers also were maintained at 580° F. Die temperature was 450° F. The die rotated at about 2750 rpm and the blower motor operated at about 3200 rpm. A 48 inch collector in the form of an annular ring centered on the center of the rotating die was used; it was sprayed with a silicon composition prior to start of operation to protect against sticking of filaments to the ring. Filaments in the form of a tube were taken off using a winder operating at 88 feet/minute. A pull roll operated at 115 feet/minute and a bow roll at 79 feet/minute.

The resulting web contained a plurality of substantially randomly disposed substantially continuous filaments of about 1.5 denier. The web was 75 inches wide, 10 mm thick and had a weight of one-half osy. Mechanical properties of the web included machine and cross direction tensile strengths of about 2 and 4 pounds, respectively, elongations of about 256 and 509%, respectively and a relative friction number of 300. Friction number relative to a 2.1 osy mattress ticking fabric knit from continuous filament polyester yarns was 32°. By way of comparison, a one-half osy nonwoven web prepared in a similar manner but from polypropylene homopolymer had a relative friction number of 25° and a friction number relative to the polyester fabric at 22° C.

EXAMPLE 2

An antiskid nonwoven web as obtained in Example 1 was laminated to a 3.1 osy needlepunched web of 5 denier, 4 inch long polypropylene staple fiber with about 10 crimps/inch that had been prepared from a homopropylene resin obtained from Amoco Chemical Company having a nominal melt flow rate of 8 g/10 minutes. Properties of the web were as follows: machine and cross directional grab strengths of about 74 and 100, respectively, elongations at break of about 60% in both directions, machine and cross directional trapezoidal tear strengths of about 30 and 42 pounds, Mullen burst strength of 193 psi and thickness of about 27 mm.

The laminate was prepared by feeding the antiskid nonwoven and the needlepunched web from independent feed rolls to the nip between a rubber roll and an embossing roll carrying a cross-weave pattern having the appearance of woven burlap. The embossing roll was operated at 370° F.; roll pressure at the nip was about 950 to 1050 psi. Water was applied to the nonwoven antiskid web as a fine spray upstream of the nip; a bead of water was maintained at the nip. Relative friction number of the resulting laminate was 45° for the antiskid web surface. Friction number relative to the polyester fabric used in Example 1 was 44° for the antiskid surface.

Other properties of the composite were as follows: machine and cross direction grab strengths of about 95 and 105 pounds, respectively, elongations at break of about 48 and 52% respectively, trapezoidal tear strengths of about 32 and 38 pounds, respectively, Mullen burst strength of about 208 psi and thickness of about 32 mm. The fabric is well suited for use as a filler cloth for bedding.

EXAMPLE 3

An antiskid nonwoven web was prepared substantially as in Example 1 except that the resin composition used in preparation thereof was a blend of three parts by weight of the resin used in Example 1 with one part by weight of a homopolymer polypropylene resin having a nominal melt flow rate of 33 grams/10 minutes. A composite was prepared from the resulting web and a needlepunched nonwoven fabric as in Example 2 according to the procedure of that example. Relative friction number of the antiskid surface of the composite was 44°. Friction number relative to the polyester fabric used in Example 1 was 41°.

As can be seen from this example, dilution of the elastomeric olefin polymer from which the antiskid web was produced still yielded a web with good friction properties.

EXAMPLE 4

An antiskid web as in Example 1 was adhered to a 3.5 osy homopolymer polypropylene, needlepunched nonwoven staple fiber web having machine and cross directional grab strengths of about 75 and 111 pounds, respectively, elongations at break of about 69 and 60%, respectively, trapezoidal tear strengths of about 32 and 45 pounds, respectively, Mullen burst strength of about 210 psi and thickness of about 32 mm. The composite was prepared as in Example 2. Properties of the composite included machine and cross direction grab strengths of about 95 and 121 pounds, respectively, elongations at break of about 50 and 52%, respectively, trapezoidal tear strengths of about 33 and 44 pounds, respectively, Mullen burst strength of about 217 psi and thickness of about 35 mm.

Relative friction number of the antiskid web surface of the composite was 48°. Friction number relative to the polyester fabric used in Example 1 was 44°. For comparison, a sample of the needlepunched staple fiber web was embossed as in Example 2 and tested for friction properties. Relative friction number was 30° while friction number relative to the polyester fabric used in Example 1 was 24°.

The properties of this fabric are well suited for decking fabric applications.

We claim:

1. A furniture fabric comprising adhered layers of at least one nonwoven, antiskid web and at least one needlepunched nonwoven web comprising staple fibers, wherein the antiskid web forms at least one external surface of the fabric and comprises randomly disposed, substantially continuous filaments comprising a multi-phase, thermoplastic, elastomeric olefin copolymer, and has a basis weight of about ¼ to about 1 ounce per square yard, a relative friction number, determined according to ASTM D3334-80, of at least about 28 degrees relative to a needlepunched, calendered nonwoven fabric composed of homopolymer polypropylene, 5 denier staple fibers having average length of four inches and provides said external surface of the fabric with frictional resistance in contact with other fabrics but without tackiness.

2. The fabric of claim 1 wherein each external surface of the fabric is formed by the nonwoven antiskid web comprising randomly disposed, substantially continuous filaments.

3. The fabric of claim 1 wherein at least one surface of the needlepunched nonwoven web is fused.

4. The fabric of claim 1 wherein the staple fibers of the needlepunched nonwoven web comprise polypropylene fibers.

5. The fabric of claim 4 wherein the nonwoven web of randomly disposed, substantially continuous filaments is a self-bonded web.

6. The fabric of claim 4 wherein the nonwoven web of randomly disposed, substantially continuous filaments is a spunbonded web.

7. The fabric of claim 4 wherein the nonwoven web of randomly disposed, substantially continuous filaments is a meltblown web.

8. The fabric of claim 4 wherein the multi-phase, thermoplastic, elastomeric olefin copolymer comprises at least one thermoplastic segment and at least one elastomeric segment, the thermoplastic segment comprising polypropylene homopolymer or propylene-dominated propylene-ethylene copolymer and the elastomeric segment comprising an ethylene-higher alpha-olefin or ethylene-higher alpha-olefin-diene copolymer.

9. A furniture fabric comprising adhered layers of at least one nonwoven, antiskid web and at least one needlepunched nonwoven web comprising staple fibers, wherein the antiskid web forms at least one external surface of the fabric and comprises randomly disposed, substantially continuous filaments comprising a multi-phase, thermoplastic, elastomeric olefin copolymer comprising at least one crystalline homopolymer or copolymer segment of at least one polymerized alpha-olefin of two to about eight carbon atoms, and at least one elastomeric segment, constituting about 20 to about 80 weight % of the multi-phase copolymer, comprising a rubbery copolymer of at least one alpha-olefin of two to about eight carbon atoms and/or diolefin of 4 to about 20 carbon atoms, and the web has a basis weight of about ¼ to about 1 ounce per square yard and provides said external surface of the fabric with frictional resistance in contact with other fabrics but without tackiness.

10. The fabric of claim 9 wherein each external surface of the fabric is formed by the nonwoven antiskid web comprising randomly disposed, substantially continuous filaments.

11. The composite fabric of claim 9 wherein at least one surface of the needlepunched nonwoven web is fused.

12. The composite fabric of claim 9 wherein the staple fibers of the needlepunched nonwoven web comprise polypropylene fibers.

13. The composite fabric of claim 12 wherein the nonwoven web of randomly disposed, substantially continuous filaments is a self-bonded web.

14. The composite fabric of claim 12 wherein the nonwoven web of randomly disposed, substantially continuous filaments is a spunbonded web.

15. The composite fabric of claim 12 wherein the nonwoven web of randomly disposed, substantially continuous filaments is a meltblown web.

16. The composite fabric of claim 12 wherein the crystalline segment of the multi-phase, thermoplastic, elastomeric copolymer comprises polypropylene homopolymer or propylene-dominated propylene-ethylene copolymer and the elastomeric segment of the multi-phase, thermoplastic, elastomeric copolymer comprises an ethylene-higher alpha-olefin or ethylene-higher alpha-olefin-diene copolymer.

17. The composite fabric of claim 16 wherein one external surface of the fabric is formed by the nonwoven web of randomly disposed, substantially continuous filaments and one external surface of the composite fabric is formed by the needlepunched nonwoven web.

18. The composite fabric of claim 17 wherein the surface formed by the nonwoven web of randomly disposed, substantially continuous filaments has a relative friction number, determined according to ASTM D3334-80, of at least about 30 degrees relative to a needlepunched calendered nonwoven fabric composed of homopolymer polypropylene, 5 denier staple fibers having average length of four inches.

* * * * *

UNITED STATES PATENT AND TRADEMARK OFFICE
CERTIFICATE OF CORRECTION

PATENT NO. : 5,942,452
DATED : August 24, 1999
INVENTOR(S) : Diego H. Daponte, Paul E. Swindell, Thomas L. Oakley, Kenneth W. Burgess, Steven M. Pruitt It is certified that error appears in the above-indentified patent and that said Letters Patent is hereby corrected as shown below:

Patent reads:

| Col. | Line | |
|---|---|---|
| 2 | 55 | "thereof as roligoods"<br><br>should read:<br>"thereof as rollgoods" |
| 3 | 13 | "prescribed weight rapped"<br><br>should read:<br>"prescribed weight wrapped" |

UNITED STATES PATENT AND TRADEMARK OFFICE
CERTIFICATE OF CORRECTION

PATENT NO. : 5,942,452  Page 2 of 5
DATED : August 24, 1999
INVENTOR(S) : Diego H. Daponte, Paul E. Swindell, Thomas L. Oakley, Kenneth W. Burgess, Steven M. Pruitt It is certified that error appears in the above-indentified patent and that said Letters Patent is hereby corrected as shown below:

14    51    "number of 300."

should read:
           "number of 300."

16    60    "The composite fabric of"

should read:
           "The fabric of"

UNITED STATES PATENT AND TRADEMARK OFFICE
CERTIFICATE OF CORRECTION

PATENT NO. : 5,942,452  Page 3 of 5
DATED : August 24, 1999
INVENTOR(S) : Diego H Daponte, Paul e Swindell, Thomas L. Oakley
Kenneth W. Burgess, Steven M. Pruitt It is certified that error appears in the above-indentified patent and that said Letters Patent is hereby corrected as shown below:

Patent reads:

| Col. | Line | |
|------|------|---|
| 17 | 7 | "The composite fabric of"<br><br>should read:<br>"The fabric of" |
| 17 | 4 | "The composite fabric of"<br><br>should read:<br>"The fabric of" |

UNITED STATES PATENT AND TRADEMARK OFFICE
CERTIFICATE OF CORRECTION

PATENT NO. : 5,942,452                 Page 4 of 5
DATED       : August 24, 1999
INVENTOR(S) : Diego H. Daponte, Paul e. Swindell, Thomas L. Oakley,
                 Kenneth w. Burgess, Steven M. Pruitt It is certified that error appears in the above-indentified patent and that said Letters Patent is hereby corrected as shown below:

| | | |
|---|---|---|
| 17 | 14 | "The composite fabric of"<br><br>should read:<br>"The fabric of" |
| 18 | 4 | "The composite fabric of"<br><br>should read:<br>"The fabric of" |

UNITED STATES PATENT AND TRADEMARK OFFICE
CERTIFICATE OF CORRECTION

Page 5 of 5

PATENT NO. : 5,942,452
DATED : August 24, 1999
INVENTOR(S) : Diego H. Daponte, Paul E. Swindell, Thomas L. Oakley, Kenneth W. Burgess, Steven M. Pruitt It is certified that error appears in the above-indentified patent and that said Letters Patent is hereby corrected as shown below:

| Col. | Line |  |
|------|------|--|
| 16 | 62 | "The composite fabric of" should read: "The fabric of" |
| 16 | 65 | "The composite fabric of" should read: "The fabric of" |
| 17 | 1 | "The composite fabric of" should read: "The fabric of" |

Signed and Sealed this

Twentieth Day of March, 2001

Attest:

NICHOLAS P. GODICI

Attesting Officer

Acting Director of the United States Patent and Trademark Office